United States Patent

Ramprashad (10) Patent No.: US 9,412,354 B1
(45) Date of Patent: Aug. 9, 2016

(54) METHOD AND APPARATUS TO USE BEAMS AT ONE END-POINT TO SUPPORT MULTI-CHANNEL LINEAR ECHO CONTROL AT ANOTHER END-POINT

(71) Applicant: Apple Inc., Cupertino, CA (US)

(72) Inventor: Sean Anthony Ramprashad, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 22 days.

(21) Appl. No.: 14/601,129

(22) Filed: Jan. 20, 2015

(51) Int. Cl.
*G10K 11/16* (2006.01)
*H04R 3/00* (2006.01)

(52) U.S. Cl.
CPC .............. *G10K 11/16* (2013.01); *H04R 3/005* (2013.01)

(58) Field of Classification Search
CPC .................................................. G10K 11/16
See application file for complete search history.

(56) References Cited

U.S. PATENT DOCUMENTS

| 7,359,504 | B1 | 4/2008 | Reuss et al. |
| 2013/0211828 | A1 | 8/2013 | Gratke et al. |
| 2014/0025374 | A1 | 1/2014 | Lou |
| 2014/0093093 | A1 | 4/2014 | Dusan et al. |
| 2014/0307882 | A1 | 10/2014 | LeBlanc et al. |

*Primary Examiner* — Paul Huber
(74) *Attorney, Agent, or Firm* — Blakely, Sokoloff, Taylor & Zafman LLP (57) ABSTRACT

A conference system is described that transfers audio signals/streams between a near-end computing system and a far-end computing system. The near-end system may produce a plurality of microphone beams capturing various areas of the near-end. The beams may include primary beams directed at targets of interest and secondary beams focused on sound sources away from the targets of interest. The secondary beams may be selectively used as de-correlating signals for de-correlating the primary beams. The mixing may be made using a scale factor to produce a new primary beam. When the new beam does not provide significant de-correlation and the original raw primary beams are already sufficiently de-correlated, the original raw primary beams may be transmitted to the far-end system.

20 Claims, 7 Drawing Sheets

METHOD AND APPARATUS TO USE BEAMS AT ONE END-POINT TO SUPPORT MULTI-CHANNEL LINEAR ECHO CONTROL AT ANOTHER END-POINT

FIELD

Echo cancellation systems and methods are described that selectively introduce de-correlation signals captured by beams, which are spatially away from a primary sound source, into one or more primary audio channels. The added de-correlation signals mitigate misalignment problems that may be experienced by multi-channel linear echo cancellers. Other embodiments are also described.

BACKGROUND

Communication systems have become more sophisticated and advanced over the past several decades. For example, many traditional communication devices utilized only a single microphone to sense sound from either a near-end or a far-end user. These more basic systems experience echo. For the far-end system this is caused by the pickup of monophonic sound which originates from the near-end user that is played through a far-end system's loudspeaker or loudspeakers. The monophonic nature of the echo, either due to the monophonic nature of the near-end source and/or playback over only one loudspeaker on the far-end system, often means this echo can be efficiently controlled through the use of a dedicated monophonic echo canceller assigned to the far-end microphone, or each of the far-end microphones or beams.

Similarly, if the echo is monophonic in nature at the near-end user, either due to the monophonic nature of the far-end source and/or playback over only one loudspeaker by the near-end system, the near-end system can often efficiently cancel echo using a monophonic echo canceller.

However, many modern systems may generate multiple channels of audio corresponding to separate areas of the near-end. Examples include the use of multiple microphones, different beamformers, and even addition of other sources into the channels such as recorded music or audio from games or movies.

In addition, many modern systems have the ability to use more than one loudspeaker. Thus, in scenarios where the playback of such multiple channels is done over multiple loudspeakers the nature of the echo is often not monophonic, but multi-channel. This requires use of a multi-channel echo canceller to cancel echo.

Multi-channel echo cancellers have a number of challenges that monophonic echo cancellers do not. One of these challenges is due to the nature of the multi-channel sources that are then played over the loudspeaker. For example, due to the nature of many multi-channel pick up systems, and the environment they operate in, the multiple channels may be highly correlated. This high correlation between channels may result in a multi-channel echo canceller not being able to accurately estimate echo paths corresponding to the different channels. This is a situation of misalignment in channel estimates that results in poor stereo acoustic echo cancellation.

One solution to mitigate this problem is to modify the multiple channels so that there is less inter-channel correlation. This is the technique of decorrelation, often implemented in the playback system. Although de-correlation techniques may be used to assist in stereo acoustic echo cancellation, these "downlink" de-correlation techniques often entail non-linear modifications to individual channels, and thus may introduce artifacts into the signals. They may even dramatically change the nature of critical sounds (e.g., musical instruments).

These downlink decorrelation techniques (e.g., the far-end system would apply decorrelation in its own "downlink" playback system in order to assist in its own multi-channel echo cancellation) are reactive systems that can only work using the available channels that have been received by from the far-end device. They are thus more reactive in nature.

Further, in some cases, de-correlation may not always be appropriate. Accordingly, systems that uniformly/automatically apply de-correlation to one or more channels may be doing so unnecessarily.

In addition, there is information that the near-end system has that the far-end system does not have, which may aid in decorrelation for helping the far-end (e.g., the near-end often has more channels available to it that are not transmitted to the far-end).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

In one embodiment, a conference system is described that transfers audio signals/streams between a near-end computing system and a far-end computing system. The audio streams may represent separate channels of audio and may be captured by each of the near-end and far-end computing systems using associated microphone arrays consisting of multiple microphones.

In one embodiment, a microphone array in the near-end system may produce a plurality of microphone beams capturing sound in various areas of the near-end. As used herein, the term "beam" is defined as any signal produced by a combination of microphones. Accordingly, although multiple microphones may be used for generating a beam, in some embodiments a beam may be based on inputs from a single microphone. Some of the generated beams may be directed at targets of interest and are accordingly considered primary beams. For example, left and right channel beams may focus on one or more near-end users. Other/secondary beams may be focused on sound sources away from the targets of interest (e.g., a fan, a television, etc.).

In some embodiments, the secondary beams may be selectively used as de-correlating signals for de-correlating the primary beams. In particular, a new left channel beam may be generated by mixing a de-correlating beam with the raw left channel beam using a scale factor. Correlation values between (1) the new left channel beam and the raw right channel beam and/or (2) the raw right and left channel beams may be used to determine whether to (1) transmit the new left channel beam to the far-end system or (2) transmit the original raw left channel beam to the far-end system. In particular, when the new left channel beam provides a predefined amount of de-correlation in relation to the raw right channel beam, this new left channel beam may be transmitted along with the raw right channel beam to the far-end system. In contrast, when the new left channel beam does not provide significant de-correlation and the original raw left and right channel beams are already sufficiently de-correlated, the original raw left and right channel beams may be transmitted to the far-end system.

Although described in a stereo configuration, in other embodiments, the system described herein may be extended to a multi-channel system. Further, although described as mixing a de-correlating beam with only one primary channel/beam, in other embodiments mixing of de-correlating beams may be performed with multiple primary beams (e.g., both left and right channel beams).

As described above and as will be described in greater detail below, the systems and methods presented herein provide selective de-correlation at the near-end system. Accordingly, this approach (1) eliminates the need for de-correlation at the far-end, which may introduce ill-effects, and (2) utilizes sounds in the near-end for de-correlation, which may present a more natural modification to transmitted sounds.

Also, although techniques have been described herein as operating at the near-end system in order to improve the multi-channel echo control at the far-end system, these techniques can be similarly used at the far-end system to improve multi-channel echo-control at the near-end system. The description herein will, without loss in generality, focus on the application of techniques at the near-end system.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments are described with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

Figure 1:
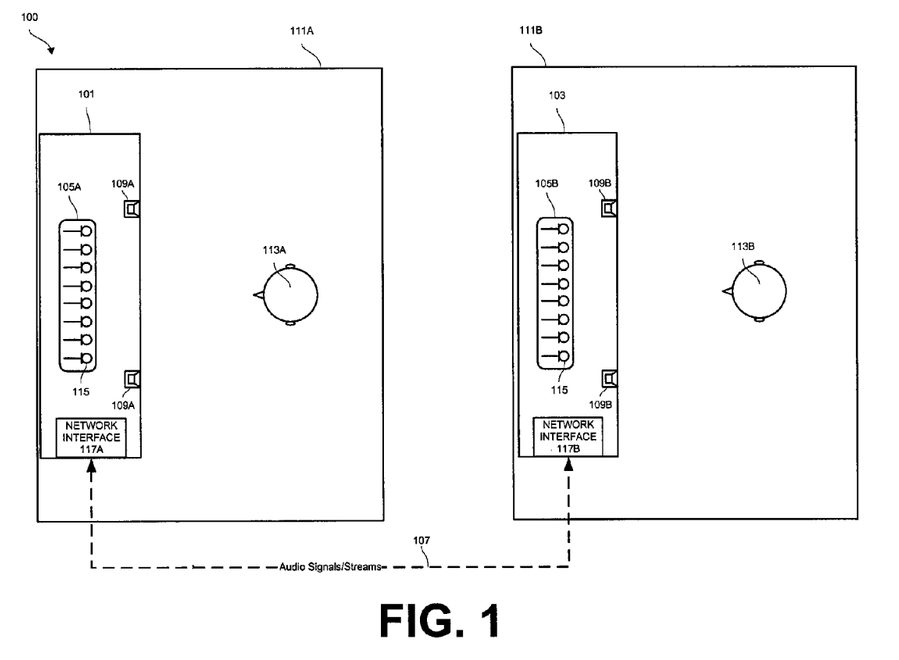
FIG. 1 shows a conference system that transfers audio signals/streams between a near-end computing system and a far-end computing system according to one embodiment.

FIG. 1 shows a conference system 100 that transfers audio signals/streams between a near-end computing system 101 and a far-end computing system 103. The audio streams may represent separate channels of audio and may be captured by each of the near-end and far-end computing systems 101 and 103 using associated microphone arrays 105A and 105B. The conference system 100 may synchronously or asynchronously transfer audio signals/streams between the near-end and far-end systems 101 and 103 over the data connection 107 such that each of the channels represented by these signals/streams may be played through corresponding loudspeakers 109A/109B. Each system 101 and 103 often may not transmit all available channels to the other system 101 and 103 (e.g., the system 101 may not transmit all possible audio channels it can create over the data connection 107 to system 103), but rather may select or mix only a subset of such channels into a set of channels to transmit. There are therefore operations on the channels that the system 101 can perform that the system 103 cannot perform. Each element of the conference system 100 will be described by way of example below. In some embodiments, the conference system 100 may include more elements than those shown and described.

As shown in FIG. 1, the near-end system 101 may be located at a first location 111A (i.e., the near-end) and the far-end system 103 may be located at a second location 111B (i.e., the far-end). For example, the first location 111A may be a business conference room being utilized by the near-end user 113A and the second location 111B may be a business conference room being utilized by the far-end user 113B. However, in some embodiments, the first location 111A and/or the second location 111B may be outdoor areas. The first and second locations 111A and 111B may be separated by any distance (e.g., 500 feet or 500 miles) and the near-end system 101 and the far-end system 103 may communicate with each other using the data connection 107.

The data connection 107 may be any combination of wired and wireless mediums operating in a distributed or a point-to-point network. For example, the data connection 107 may utilize a combination of wired and wireless protocols and standards, including the IEEE 802.11 suite of standards, IEEE 802.3, cellular Global System for Mobile Communications (GSM) standards, cellular Code Division Multiple Access (CDMA) standards, Long Term Evolution (LTE) standards, and/or Bluetooth standards.

Figure 2:
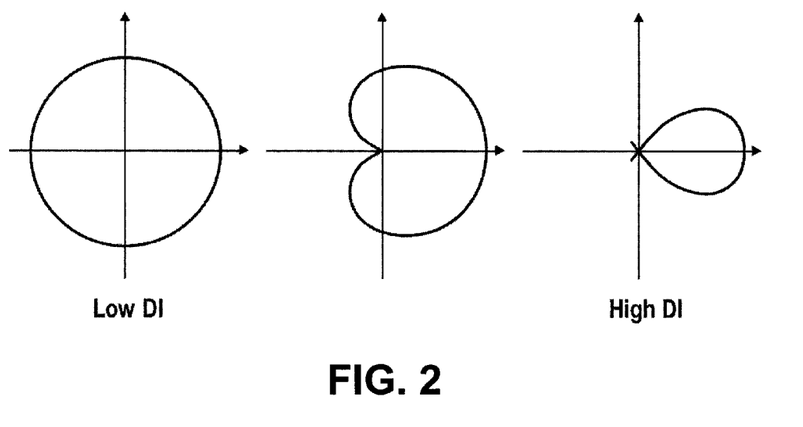
FIG. 2 shows various beam patterns with varied directivity indexes that may be generated using microphones in microphone arrays integrated within the near-end system and/or the far-end system according to one embodiment.

As noted above, in one embodiment, the near-end system 101 may include a microphone array 105A. The microphone array 105A may be composed of N microphones 115 (N≥2) that sense sounds and convert these sensed sounds into electrical signals. The microphones 115 may be any type of acoustic-to-electric transducer or sensor, including a Micro-Electrical-Mechanical System (MEMS) microphone, a piezoelectric microphone, an electret condenser microphone, or a dynamic microphone. The microphones 115 in the microphone array 105A may utilize various weights and delays to provide a range of beam/polar patterns, such as cardioid, omnidirectional, and figure-eight patterns. An individual microphone may also be used as a "beam" to produce a desired response. Thus, in the text to follow it should be understood that the term beam may also refer to the output from a single microphone 115. The generated beam patterns, in particular when beams result from combining single microphones, alter the direction and area of sound captured in the vicinity of the first location 111A. In one embodiment, the beam patterns of the microphones 115 may vary continuously over time. In another embodiment, a number of simultaneous fixed-beam patterns may be processed and produced in parallel. FIG. 2 shows various beam patterns with varied directivity indexes that may be generated using the microphones 115 in the microphone array 105A. In this example, the directivity indexes of the beam patterns increase from left to right.

Figure 3:
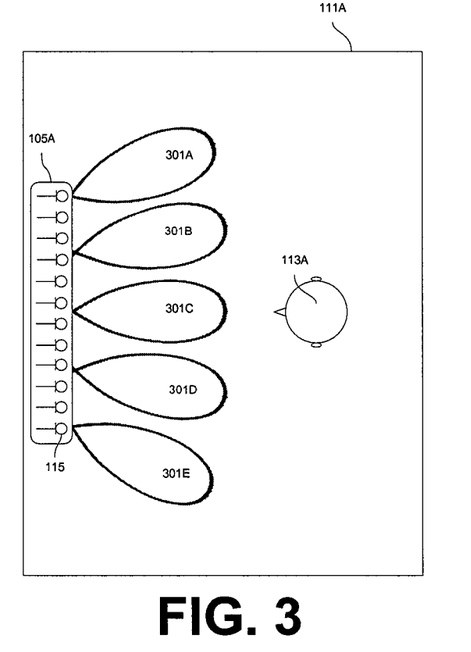
FIG. 3 shows a set of five beam patterns produced by the microphone array integrated within the near-end system according to one embodiment.

In one embodiment, separate sets of microphones 115 within the microphone array 105A may be used to capture separate areas of the first location 111A. In this embodiment, each set of microphones 115 may generate a separate beam pattern that is directed at a particular area of the first location 111A. For example, as shown in FIG. 3, the microphones 115 may generate five separate fixed beams 301A-301E. As shown, the beams 301A and 301B are focused in an area of the first location 111A to the right of the user 113A, the beam 301C is focused in an area of the first location 111A occupied by the user 113A, and the beams 301D and 301E are focused in an area of the first location 111A to the left of the user 113A. Although shown in FIG. 3 and described in relation to five beams, the N microphones 115 in the microphone array 105A may generate any number of beams with uniform or non-uniform directivities, directions, etc.

In one embodiment, the near-end system 101 may include a network interface 117A for transmitting and receiving signals to/from the far-end system 103. For example, the near-end system 101 may transmit audio and/or video signals over the data connection 107 via the network interface 117A. The network interface 117A may operate using any combination of wired and wireless protocols and standards, including the IEEE 802.11 suite of standards, IEEE 802.3, cellular Global System for Mobile Communications (GSM) standards, cellular Code Division Multiple Access (CDMA) standards, Long Term Evolution (LTE) standards, and/or Bluetooth standards.

As noted above, the near-end system 101 may include two or more loudspeakers 109A for outputting audio received from the far-end system 103 or from another source. In one embodiment, the loudspeakers 109A may receive audio signals from the far-end system 103 via the network interface 117A. Although shown as being separate, in some embodiments, the loudspeakers 109A may operate in an array. Further, although described as including two loudspeakers 109A, in other embodiments different numbers of loudspeakers 109A may be used with uniform or non-uniform spacing and alignment.

Each of the loudspeakers 109A may include a transducer for outputting sound. The transducers may be any combination of full-range drivers, mid-range drivers, subwoofers, woofers, and tweeters. Each of the transducers may use a lightweight diaphragm, or cone, connected to a rigid basket, or frame, via a flexible suspension that constrains a coil of wire (e.g., a voice coil) to move axially through a cylindrical magnetic gap. When an electrical audio signal is applied to the voice coil, a magnetic field is created by the electric current in the voice coil, making it a variable electromagnet. The coil and the transducers' magnetic system interact, generating a mechanical force that causes the coil (and thus, the attached cone) to move back and forth, thereby reproducing sound under the control of the applied electrical audio signal coming from a source (e.g., the far-end system 103). Each transducer may be individually and separately driven to produce sound in response to separate and discrete audio signals.

Although described in relation to the near-end system 101, the far-end system 103 may be similarly configured. In particular, the microphone array 105B, the loudspeakers 109B, and the network interface 117B of the far-end system 103 may be similar or identical to the microphone array 105A, the loudspeakers 109A, and the network interface 117A of the near-end system 103.

Figure 4A:
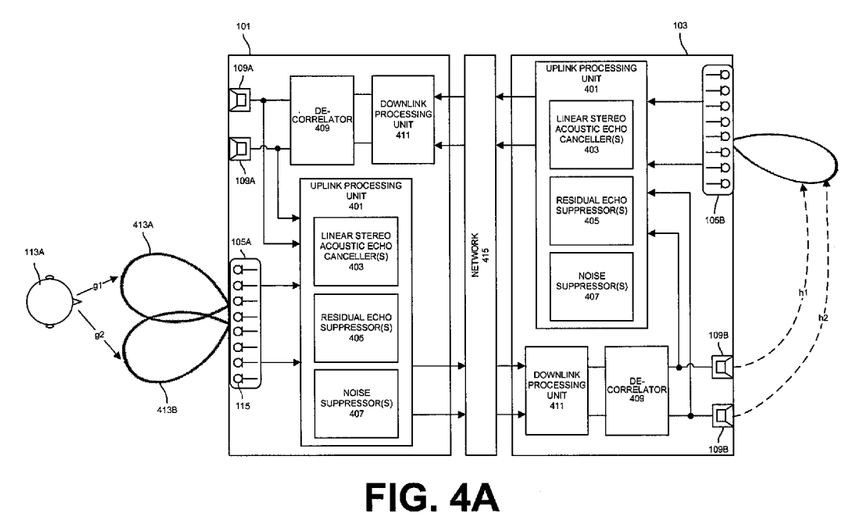
FIG. 4A shows a component diagram of the near-end system and the far-end system according using downlink decorrelation.

FIG. 4A shows a component diagram of the near-end system 101 and the far-end system 103 using a downlink decorrelation technique. Each element of the component diagram of FIG. 4A will now be described by way of example.

Misalignment

As shown in FIG. 4A, the near-end system 101 may produce a multi-channel stream transmitted over the network 415 for playback at the far-end system 103 (e.g., left and right channels). These channels may be produced using two microphone beams 413A and 413B generated using the microphone array 105A and each beam 413A and 413B may go through similar uplink processing. Although shown with two beams 413A and 413B, in other embodiments more microphone beams 413 may be used/generated. As used herein, the term "beam" is defined as any signal produced by a combination of microphones 115. Accordingly, although multiple microphones 115 may be used for generating a beam 413, in some embodiments a beam 413 may be based on inputs from a single microphone 115. Further, in some embodiments, beams 413A and 413B may be adaptive and/or selected from a number of candidate beams 413.

The beams 413A and 413B shown in FIG. 4A represent primary beams that are focused on sound sources of interest at the near-end location 111A. For example, as shown in FIG. 4A, the beams 413A and 413B may each focus on the near-end user 113A. Accordingly, the beam 413A may represent a right channel and the beam 413B may represent a left channel for sound emitted by the near-end user 113A.

The uplink processing units 401 of both the near-end system 101 and the far-end system 103 may provide linear acoustic echo control using one or more linear stereo acoustic echo cancellers 403. Processing by the uplink processing units 401 may also include one or more non-linear residual echo suppressors 405 and one or more noise suppressors 407. Although not shown, the near-end and far-end systems 101 and 103 may each include additional blocks/units to blend the two or more of the beams 413 to produce the required number of channels for uplink. In such applications, the stereo acoustic echo cancellers 403 may be critical elements needed to control echoes and enable full-duplex communication between the near-end system 101 and the far-end system 103. Although described as stereo, in other embodiments the stereo acoustic echo cancellers 403 may be general multi-channel acoustic echo cancellers. The stereo acoustic echo cancellers 403 are needed instead of monophonic acoustic echo cancellers since there may be more than one independent playback signal to be processed. Any loss in performance by the stereo acoustic echo cancellers 403 will often dominate over the effects of other uplink processing. In some embodiments, there may be a dedicated stereo acoustic echo canceller 403 for each beam 413A and 413B used to drive the uplink output.

Given the correlation that may exist between left and right playback channels (or more than two channels) due to the very nature of the acoustic pickup by the beams 413A and 413B, the stereo acoustic echo cancellers 403 at the far-end system 103 may have the inherent problem of accurately identifying individual couplings (i.e., individual impulse responses) from the left and right loudspeakers 109A and 109B to the stereo acoustic echo cancellers 403. As described herein, each stereo echo canceller 403, being driven by a different beam 413A and 413B, has its own impulse response to model (e.g., h1 and h2).

In FIG. 4A, the correlation between impulse responses h1 and h2 may be due to the fact that a common source (e.g., the near-end user 113A) drives the input to both beams 413A and 413B through two correlated paths or correlated impulse responses g1 and g2. This scenario may be extended to two or more sources (e.g., multiple near-end users 113A), where it is clear that such correlations are inherent given the stereo/multi-channel nature of the pickup.

Also, although not illustrated, other signals (e.g., recorded music) may also be introduced into the downlink playback (e.g., before or after the far-end downlink processing). Such signals may have inherent channel correlations due to the way such material is originally created.

The correlation between the impulse responses h1 and h2 may lead to the stereo echo cancellers 403 making misaligned estimates of individual channel impulse responses. Such misalignment means that estimates of h1 and h2 internal to the stereo acoustic echo cancellers 403 do not represent the true impulse responses (e.g., may represent some mixed version or linear combination of the true impulse responses). The misalignment may be a function of g1, g2, h1, and h2. As a result, and different from a monophonic scenario, any change in the near-end correlations g1 and g2 may lead to a deterioration in echo cancellation effectiveness.

Also, similar to monophonic scenarios, any change in far-end impulse responses (i.e., the h1 and h2 being modeled by the stereo acoustic echo cancellers 403) may also lead to a loss in echo cancellation. Here, misalignment and correlation can slow re-convergence of the stereo acoustic echo cancellers 403.

Such losses due to misalignment can be dramatic with the stereo echo cancellers 403 and in the extreme cases may even cause a stereo echo canceller 403 to amplify echo. The result is that stereo acoustic echo canceller 403 misalignment leads to a non-robust, low-performance system.

Misalignment Mitigation

One solution to mitigate misalignment is illustrated in FIG. 4A. The solution in this system involves the introduction of non-linear distortions into the far-end downlink signals using the de-correlator 409 after receipt from the near-end system 101 through the downlink processing unit 411, but before playback. There are several possible ways to introduce these non-linear distortions, including (1) distortions driven by half-wave rectification; (2) additive noise under some masking threshold; (3) phase distortions in different frequency bins; and (4) application of time-varying all-pass filters on one or both channels. All these effects introduce non-linearly related (in terms of channel to channel comparisons) distortion into one or more of the channels.

While effective in helping mitigate misalignment, such non-linear changes may have very severe/bad perceptual effects on the downlink signal. For example, there may be roughness noted in very harmonic signals (e.g., voiced signals), general noise may be noticed, and stereo images may move in odd/annoying ways.

Basis for Different Misalignment Mitigation

In some situations, for some microphone systems, and on some material, de-correlation may not be needed. This may be due to imperfections in the beams 413, or other sources of signal and/or noise introduced by the uplink into the left and right channels. It may also be inherent in the material (e.g., in some musical content different instruments may be panned very differently on different channels). Thus, de-correlation is not always needed and thus should in general be adaptive. However, there are enough cases where de-correlation is necessary such that its use cannot be ignored. For such cases, perceptible distortion/degradation in the signals played over loudspeakers 109B is a problem when de-correlation is introduced.

The observation that the near-end processing and/or the inherent nature of signals may already be sufficient to de-correlate the left and right channels 413A and 413B, and the fact that the near-end system 101 has at its disposal more audio information than it would ordinarily transmit to the far-end system 103, forms a basis for one embodiment of the invention. Here the near-end system 101 helps reduce or eliminate the need for unit 409 in the far-end system 103 of FIG. 4A.

Another basis involves systems that may include multiple microphones 115 and may produce multiple microphone beams 413, including beams of varying widths (i.e., narrow and wide microphone beams 413).

As will be described in greater detail below, in one embodiment many beams 413 may be considered/analyzed at once. In particular, several beams 413 of different widths (e.g., narrow) may be examined simultaneously and these beams 413 may be selected or steered to focus on a new location at the first location 111A. These beams 413 may be mixed and blended before uplink output and/or mixed at a low level into the uplink output. This particular case opens the possibility for more careful and proactive de-correlation of the signals at the transmitting near-end system 101 without introducing unnatural effects in playback at the receiving far-end system 103 (e.g., due to de-correlator unit 409) as will be described in greater detail below.

Introducing De-Correlation Sound into an Uplink Signal Using a Microphone Beam

In one embodiment, near-end or "uplink" de-correlation may be performed at the near-end system 101 (during the uplink process) through the use of additional near-end beams 413 to mitigate misalignment problems experienced in stereo or multi-channel linear echo cancellers 403 at the far-end system 103. The beams 413 may be obtained by processing signals from multiple microphones 115, where an array 105A of such microphones 115 is used at the near-end system 101 to drive primary uplink outputs.

Figure 4B:
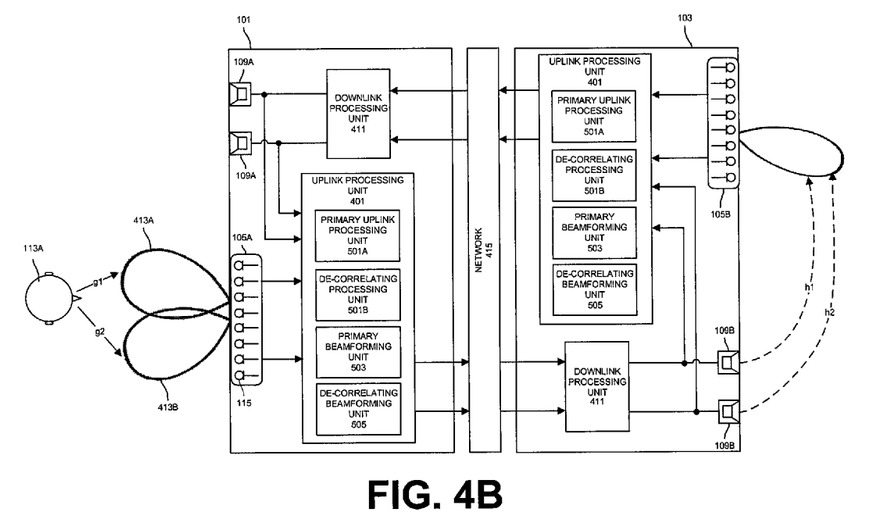
FIG. 4B shows a component diagram of the near-end system and the far-end system according to one embodiment.

FIG. 4B illustrates one embodiment of an uplink decorrelation system, focusing on modules of interest and ignoring others. The near-end system 101 used in FIG. 4B, as further illustrated in FIG. 5, may use one or more de-correlating beams 413C at the near-end to support improved echo cancellation and playback quality at one or more far-end systems 103. The use, selection, definition, processing, and mixing of these additional beams 413C into the near-end uplink output may be used for the purpose of de-correlation and with such de-correlation properties specifically evaluated in the context of stereo echo cancellation requirements for directing such selecting and processing.

Figure 5:
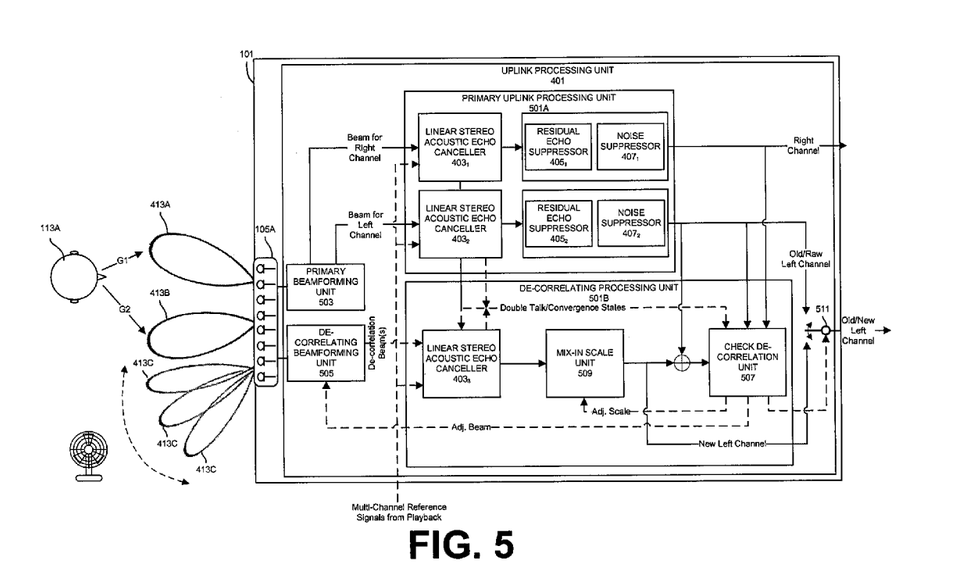
FIG. 5 shows a component diagram for the near-end system, which selectively adds de-correlating signals to a primary channel/beam before uplink to the far-end system, according to one embodiment

These beams 413C may be generated and selected by the de-correlating beamforming unit 505 from a plurality of beams and added by the de-correlating processing unit 501B either into the left, right, or any channel (represented by the beams 413A and 413B) after any primary uplink processing by the primary uplink processing unit 501A. In FIG. 5, addition of de-correlating beam(s) 413C into the transmitted output is only made into the left channel corresponding to beam 413B. However, in other embodiments, the right channel/beam 413A may have its own de-correlating beam(s) 413C that would add into the right channel/beam 413A before being fed into the check de-correlation unit 507. Accordingly, one or more of the uplink channels may have an associated de-correlating beam 413C. Such de-correlating beams 413C may focus on spatially localized secondary sources of interest (e.g., the fan illustrated in FIG. 5). These beams 413C may also detect random variations in sound that allow for de-correlation. In general, each de-correlating beam 413C may be adapted over time; however, the de-correlating beams 413C may be quite stable, producing a spatially stable ambient acoustic addition to the uplink.

De-correlating beams 413C may also be purposefully directed away from primary sources (e.g., the near-end user 113A) and areas of interest (e.g., outside of a range of beam angles relative to the main direction of the microphone array 105A). Such de-correlating beams 413C may also be different in design than the primary beams 413A and 413B (e.g., the de-correlating beams 413C may be narrower with sensitivity in a narrow spatial range smaller than the primary beams 413A and 413B).

The selection of de-correlating beams 413C may be done by the check de-correlation unit 507 which checks the effect of the de-correlating beam 413C on left/right channel correlation. This may be done much in the same way an adaptive de-correlator would check if de-correlation is added in the downlink playback. The analysis may be related to the design and requirements of the particular stereo acoustic echo canceller 403. In particular, the check de-correlation unit 507 may (1) direct the selection of the de-correlating beam 413C; (2) direct the scaling of the beam 413C using the mix-in scale unit 509 before addition into an uplink channel; (3) direct whether such a beam 413C is necessary or whether the raw uplink processed channels without a mix-in of a de-correlating beam 413C is to be used; and (4) is sensitive to the state of stereo echo cancellers 403 and whether the system is experiencing echo and/or near-end issues (e.g., double-talk status).

The processing chain for de-correlating beams 413C can also be different than that of the primary signal chain for the primary beams 413A and 413C. In particular, the de-correlating beams 413C may be added at a very low level, based on scale factors received from the mix-in scale unit 509, into one or more of the uplink channels. The low level may mean, for example, that non-linear residual echo suppression and noise suppression may also be possibly ignored and the requirements of linear-echo cancellation and other processing are possibly reduced on the de-correlation beams 413C. Additionally, residual echo suppression or noise suppression may be added into the process between the linear stereo acoustic echo canceller $403_3$ and the mix-in scale unit 509.

Given the operation of the stereo acoustic echo canceller 403 at the far-end system 103, which needs de-correlation primarily in the time instances where it is adapting, there is the option that such de-correlation be added only when the near-end uplink is active and the far-end uplink (i.e., near-end downlink) is inactive. This can be determined, roughly at the near-end system 101. If this approach is used, it can reduce/simplify the uplink processing on the de-correlating beams 413C.

Method for Generating De-Correlated Audio Channels

Figure 6:
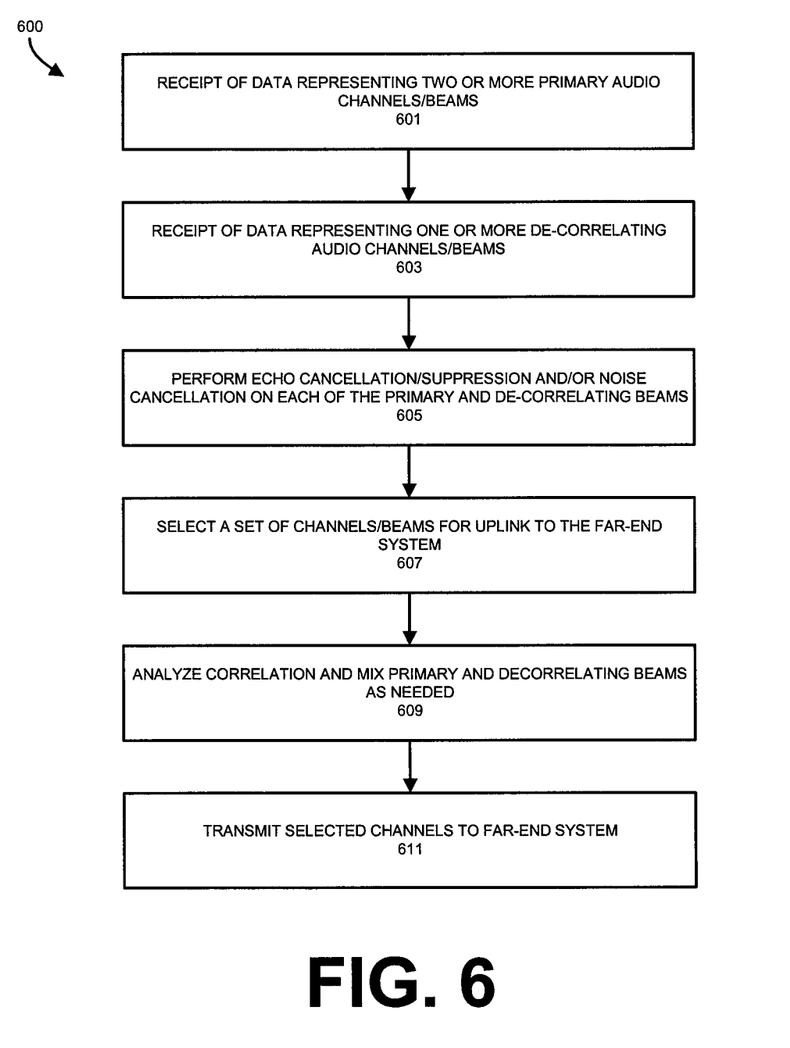
FIG. 6 shows a method for using de-correlating beams from the near-end system to support multi-channel linear echo control at the far-end system according to one embodiment.

Turning now to FIG. 6, a method 600 for using de-correlating beams 413C from the near-end system 101 to support multi-channel linear echo control at the far-end system 103 will be described. Each operation of the method 600 may be performed by one or more of the components of the near-end system 101 for the purpose of helping multi-channel echo control at the far-end system 103. In particular, one or more of the components of the near-end system 101 shown in FIG. 5 may be used to perform each operation of the method 600.

Although described and shown in a particular order, in other embodiments the operations of the method 600 may be performed in a different order. In particular, two or more of the operations of the method 600 may be performed simultaneously or during partially overlapping time periods.

The method 600 may commence at operation 601 with the receipt of data representing two or more primary audio channels/beams that represent a piece of sound program content. For example, the two or more primary channels/beams may be the beams 413A and 413B generated by the primary beamforming unit 503. The beams 413A and 413B may respectively represent a left channel and a right channel corresponding to left and right areas of the near-end and/or left and right near-end users 113A. Although described in relation to left and right channels/beams 413A and 413B, in other embodiments data describing different numbers and sets of channels/beams may be received at operation 601. In the description that follows, the two beams 413A and 413B will be used for purposes of illustration. However, as noted above, any set of primary beams may be used.

Following or concurrent with receipt of data representing channels/beams 413A and 413B, operation 603 may receive data representing a de-correlating beam. As noted above, the de-correlating beam may be generated by the de-correlating beamforming unit 505 of the near-end system 101. In particular, the de-correlating beamforming unit 505 may generate a set of narrowly focused beams (i.e., narrower than the beams 413A and 413B generated by the primary beamforming unit 503) that are aimed away from a set of primary sources (e.g., the near-end user(s) 113A). Accordingly, the de-correlating beam(s) generated at operation 603 may represent background sounds at the near-end (e.g., a fan operating at the near-end). For example, operation 603 may generate one or more of the beams 413C shown in FIG. 5 as the de-correlating beam(s). In the description that follows a single de-correlating beam 413C will be used for purposes of illustration.

Following receipt of data representing a de-correlating beam 413C, operation 605 may perform linear echo cancellation on each of the primary beams 413A and 413B and the de-correlating beam 413C. In one embodiment, this linear echo cancellation may be performed by respective linear stereo acoustic echo cancellers $403_1$-$403_3$. In some embodiments, the raw left and right channels represented by the beams 413A and 413B may be further processed using corresponding residual echo suppressors $405_1$ and $405_2$ and noise suppressors $407_1$ and $407_2$.

Operation 607 may select a set of channels/beams to output for uplink to the far-end system 103 based on the raw right channel/beam 413A, the raw left channel/beam 413B, and the de-correlating channel/beam 413C. In one embodiment, this selection of the de-correlating channel/beam 413C may be generated/set by the check decorrelation unit 507.

At operation 609, the raw left channel/beam 413B may be mixed with the de-correlating beam 413C to generate a new left channel. In one embodiment, this mixing of the raw left channel 413B with the de-correlating beam 413C may be based on a mix-in scale factor that is generated/set by the check decorrelation unit 507. Following generation of the new left channel, the check de-correlation unit 507 may check at operation 609 the cross-correlation between raw left and right channels 413A and 413B and between the new left channel and raw right channel 413A.

In one embodiment, the check de-correlation unit 507 uses an analysis consistent with the design of a linear echo canceller 403 in the far-end system 103. In particular, if a sub-band stereo acoustic echo canceller 403 is used in the far-end system 103, the left and right channels 413A and 413B may be decomposed into similar subbands by the near-end system 101.

Some form of time-alignment between left-channel and right-channel 413A and 413B subbands may be built into the measure by the check de-correlation unit 507 since the correlated portions on such channels 413A and 413B may not be localized to the same area in time. Time alignment may be handled by using long analysis blocks, different from the stereo acoustic echo cancellers 403 and in line with the lengths expected/estimated for g1 and g2. In some embodiments, a MultiDelay Filterbank (MDF) framework may be used to perform an analysis using multiple short blocks. In this embodiment, a covariance matrix of correlation values may be determined.

For example, in a matrix of correlation values $C_{LR}$ let the decomposition for time-aligned block k and subband $\Omega$ for left and right channels be denoted by $L(\Omega, k)$ and $R(\Omega, k)$, respectively. The subband $\Omega$ may be a single frequency value or a set of values. The instantaneous, normalized, and regularized cross-correlation may have a form as shown in Equation 1 below:

$$C_{LR}(\Omega,k)=(L^H(\Omega,k)R(\Omega,k))/(\|L(\Omega,k)\|\|R(\Omega,k)\|+\delta) \quad (1)$$

Equation 1

In Equation 1 above, $\delta$ is a regularization factor that allows for the reduction in the effects of low levels on left and right channels 413A and 413B. The operation ($L^H R$) signifies a vector inner-product. If structures such as an MDF are used that involve multiple blocks over the length of a far-end impulse response model, a smoothed covariance matrix may be estimated, as shown in Equation 2 below:

$$C_{LR}(\Omega,k,k1,k2)=(L^H(\Omega,k-k1)R(\Omega,k-k2))/(\|L(\Omega,k)\|\|R(\Omega,k)\|+\delta) \quad (2)$$

Equation 2

In Equation 2 above, correlation values $C_{LR}$ consider a range of values $0 \leq k1$ and $k2 \leq D$. Further, $\|L(\Omega, k)\|$ and $\|R(\Omega, k)\|$ may be the average or sum norm over all such blocks k–k1 and k–k2 given Equation 1. This covariance analysis could match the analysis that may be used by the far-end stereo acoustic echo canceller 403 (e.g., if a Recursive Least Square (RLS) approach is used, there are critical covariance matrices that are calculated). The worst-case values in the matrix may be tracked, condensing the matrix down to a single scalar, which is implicitly a time-aligned search over block-wise delays in Equation 2. In some embodiments, the covariance matrix may be limited to 2×2 or 3×3 matrices, where analysis of such matrices can use simple calculations, thereby representing at a minimum correlations between different time regions.

For simplicity of the presentation, the embodiment represented by Equation 2 is examined with a single correlation value $C_{LR}$ using a single pair of L and R blocks. The correlation value $C_{LR}$ may in general be a complex value, and if so the phase may be important and is preserved. This measure may be smoothed appropriately as shown in Equation 3 below:

$$Q_{LR}(\Omega,k)=(1-\lambda)Q_{LR}(\Omega,k-1)+\lambda C_{LR}(\Omega,k) \quad (3)$$

Equation 3

The same analysis may be done for the new left channel. For example, if the new left channel is $L'(\Omega, k)$:

$$C'_{LR}(\Omega,k)=(L'^H(\Omega,k)R(\Omega,k))/(\|L'(\Omega,k)\|\times\|R(\Omega,k)\|+\delta) \quad (4)$$

Equation 4

$$Q'_{LR}(\Omega,k)=(1-\lambda)Q'_{LR}(\Omega,k-1)+\lambda C'_{LR}(\Omega,k) \quad (5)$$

Equation 5

The same analysis may also be done to support various adaptation options (e.g., testing of other correlating beams and scale factors). The analysis on the new left channel may test different mix-in scale factors, noting that:

$$L'(\Omega,k)=L(\Omega,k)+\beta(k)B(\Omega,k) \quad (6)$$

Equation 6

In Equation 6 above, $\beta(k)$ may be the real positive scalar mix-in value and $B(\Omega, k)$ may be the frequency decomposition of the de-correlating beam 413C. The form can be used to re-use calculations in cross-correlations when considering many values of $\beta(k)$. In some embodiments, $\beta(k)$ may be frequency independent so as not to introduce non-linear changes into the de-correlating beam 413C. However, in some embodiments, some frequency dependence may be considered (e.g., $\beta(\Omega,k)$).

The analysis on the new left channel can also test other candidate de-correlating beams 413C from a subset of possible beams in a similar fashion. Again, such beams may be candidate primary beams (i.e., beams considered for the beams 413A/413B but not chosen) and as such may be available for testing without the need for additional processing. Each candidate de-correlating beam 413C may have one or more possible candidate mix-in gain values to test. Candidate de-correlating beams 413C may be beams generally directed away from the scene or primary audio sources (e.g., directed away from the near-end user 113A).

The values $Q_{LR}$ and $Q'_{LR}$ may be used, with appropriate hysteresis, to drive the selection between raw 413B and new left channels, the mix-in scale factors, and/or the de-correlating beam 413C choice. The general principle of adaptation may be as discussed below.

In one embodiment, there may be a target de-correlation T maintained in each subband and driven by the requirements of the stereo acoustic echo canceller 403. For example, either $|Q_{LR}|$ or $|Q'_{LR}|$ may be no more than 0.95. If a covariance analysis is used as described above, then some measure of the goodness of the covariance may be used (e.g., the condition number of the covariance estimate has to be less than a certain value). For 2×2 matrices, such condition numbers can be calculated without a large computational overhead.

If over time the raw left channel 413B meets this de-correlation criterion, the raw left channel 413B may be selected by the check de-correlation unit 507. However, if over time the raw channel 413B does not meet this target T and the new left channel provides an appreciable (minimum) improvement towards meeting this target or the new left channel meets this target, the check de-correlation unit 507 may select the new left channel for uplink. This selection by the check de-correlation unit 507 may trigger the switch 511 to output the appropriate new or raw left channel to the far-end system 103 via the connection 107.

If the analysis by the check de-correlation unit 507 over time shows that the mix-in scale-factor can be reduced or should be increased, the appropriate change may be made. In some embodiments, there may be limits on this scale-factor and additionally scale-factors may place a limit on the RMS level of the de-correlating signal mixed into the uplink. The scale factor may now allow the RMS level of the mixed-in de-correlating beam 413C to be more than the long-term active RMS level of the raw left channel –Z dB. A value such as Z=15 dB is an example (i.e., if the left channel 413B has a source-active level of –26 dBFs (dBov), the de-correlating beam 413C level may be limited to –41 dBFs).

The scale factor, if adapted, may have limits on the rate of change and have upper and lower bounds. If another candidate de-correlating beam 413C, over time, provides lower cross-correlation with a more attractive (e.g., lower) RMS level, this more attractive de-correlating beam 413C may be selected.

After mixing-in the de-correlating beam 413C with the raw left channel 413B and selecting between this new left channel or the raw left channel 413B as described above, operation 611 may transmit/output the selected new/old left channel along with the raw right channel 413A to the far-end system 103. Since the set of channels transmitted to the far-end system 103 has been intelligently selected/modified to be appropriately de-correlated, de-correlation systems/elements at the far-end system 103 are unnecessary and may be eliminated. This approach may avoid ill-effects of downlink-based de-correlation described above.

Further, using the system 101 and method 600 described above achieves de-correlation by near-end processing through the use of actual signals that are occurring in the near-end environment. It therefore is a natural modification to the uplink signal with a natural effect consistent with the near-end environment. As also described, de-correlation at the uplink may also be adaptive (e.g., happening only when needed), which may simplify overall processing. For example, de-correlation may be added only when the near-end uplink is active and the far-end uplink (near-end downlink) is inactive. Such cases are often precisely the case where the far-end stereo acoustic echo canceller 403 wants to adapt and when the near-end de-correlating beam(s) 413C does not need strong echo-control.

In some systems, the primary beamforming itself considers a plurality of beams of different designs, directions, and widths. The de-correlating beam(s) 413C may simply reuse the processing of the candidate primary beamformers, thus adding little additional complexity into the system 101. There is the potential to scale up such a system 101 to a multi-channel system. Such systems have more pair-wise de-correlating issues to manage, and here the use of traditional techniques (e.g., half-wave rectification and phase distortion) may not be the best approach. However, depending on the environment, it may be possible to scale the number of de-correlating beams 413C with an effective result.

Although discussed above in relation to mixing a de-correlating beam 413C into only the left channel 413B, in some embodiments a de-correlating beam 413C may also be mixed with the right channel 413A. When using de-correlating beams 413C for both channels 413A and 413B, $Q'_{LR}$ may be a cross-correlation measure between new left and new right channels.

In some embodiments, raw left and right channels 413A and 413B may be blended. In these embodiments, the de-correlating beams 413C may be added after the blend and the raw measure $Q_{LR}$ may be a cross-correlation measure after the blend.

In still other embodiments, de-correlating beams 413C may be processed with the same chain as the primary beams 413A and 413B. For example, the de-correlating beams 413C may be processed by residual echo suppressors 405 and noise suppressors 407 and may be candidate primary beams themselves. In some embodiments, the primary beams 413A and 413B may be selected based on inputs from the check de-correlation unit 507.

In some embodiments, the de-correlating beams 413C may be generated using only a subset of the microphones 115 from the array 105A. For example, if primary beams 413A and 413B use all microphones 115 from the linear array 105A, de-correlating beams 413C may use a subset of adjacent microphones 115 at one end of the array 105A. In some embodiments, the microphones 115 used for the primary beams 413A and 413B may be an entirely different set than microphones 115 used for the de-correlating beams 413C.

In some embodiments, de-correlating beams 413C may also be modified with methods used in downlink de-correlation. For example, time-varying all-pass or phase variations or even beam variations may be employed. Given the low level of such signals, such an approach may be less objectionable than modifications to the total playback signal.

As explained above, an embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A first system for transmitting audio to a second system, comprising:
   a microphone array, including a plurality of microphones;
   a primary beamforming unit to generate a plurality of primary beams, including a first primary beam and a second primary beam, focused on areas of interest at a near-end location based on inputs from the microphone array;
   a secondary beamforming unit to generate one or more secondary beams focused away from the areas of interest at the near-end location based on inputs from the microphone array;
   an adder to combine one of the secondary beams with the first primary beam to produce a new first primary beam; and
   a check de-correlation unit to select either the new first primary beam or the original first primary beam for uplink to the second system based on correlation values computed between (1) the first primary beam and the second primary beam and (2) the new first primary beam and the second primary beam.

2. The first system of claim 1, further comprising:
   a mix-in scale unit to apply a scale factor for scaling the secondary beam prior to combining the first primary beam with the secondary beam and combining the results by the adder.

3. The first system of claim 2, wherein the scale factor is controlled by the check de-correlation unit based on the correlation values computed between (1) the first primary beam and the second primary beam and (2) the new first primary beam and the second primary beam.

4. The first system of claim 1, wherein the check de-correlation unit selects a beam from the one or more secondary beams to use as a decorrelating beam.

5. The first system of claim 1, wherein the check de-correlation unit selects the original first primary beam for uplink upon detecting that a correlation value between the first primary beam and the second primary beam is greater than a predefined correlation threshold, or wherein the check de-correlation unit selects the new first primary beam for uplink upon detecting that the correlation value between the first primary beam and the second primary beam is less than the predefined correlation threshold and a correlation value between the new first primary beam and the second primary beam is greater than the predefined correlation threshold.

6. The first system of claim 4, further comprising:
a set of linear acoustic echo cancellers for processing the first primary beam, the second primary beam, and the de-correlating beam,
wherein the check de-correlation unit selects either the new first primary beam or the original first primary beam for uplink based on statistic and status data received from one or more of the linear acoustic echo cancellers.

7. The first system of claim 6, wherein the check de-correlation unit selects the new primary beam for uplink to the second system when the linear acoustic echo cancellers for the first and second primary beams have converged and have detected low levels of doubletalk based on downlink reference signals from the second system.

8. The first system of claim 1, wherein the secondary beams have greater directivity indices than directivity indices of the primary beams.

9. A method for transmitting audio from a first system to a second system, comprising:
generating a plurality of primary beams, including a first primary beam and a second primary beam, focused on areas of interest at a near-end location based on inputs from a microphone array;
generating one or more secondary beams focused away from the areas of interest at the near-end location based on inputs from the microphone array;
combining one of the secondary beams with the first primary beam to produce a new first primary beam; and
selecting either the new first primary beam or the original first primary beam for uplink to the second system based on correlation values computed between (1) the first primary beam and the second primary beam and (2) the new first primary beam and the second primary beam.

10. The method of claim 9, further comprising:
generating a scale factor for scaling the secondary beam prior to combining the first primary beam with the secondary beam.

11. The method of claim 10, wherein the scale factor is controlled based on the correlation values computed between (1) the first primary beam and the second primary beam and (2) the new first primary beam and the second primary beam.

12. The method of claim 9, wherein the original first primary beam is selected for uplink upon detecting that a correlation value between the first primary beam and the second primary beam is greater than a predefined correlation threshold.

13. The method of claim 12, wherein the new first primary beam is selected for uplink upon detecting that the correlation value between the first primary beam and the second primary beam is less than the predefined correlation threshold and a correlation value between the new first primary beam and the second primary beam is greater than the predefined correlation threshold.

14. The method of claim 9, further comprising:
performing linear acoustic echo cancelling on the first primary beam, the second primary beam, and a de-correlating beam using one or more of linear acoustic echo cancellers,
wherein selection of either the new first primary beam or the original first primary beam for uplink is made based on statistic and status data received from one or more of the linear acoustic echo cancellers.

15. The method of claim 14, wherein the new primary beam is selected for uplink to the second system when the linear echo cancellers for the first and second primary beams have converged and have detected low levels of doubletalk based on downlink reference signals from the second system.

16. The method of claim 9, wherein the secondary beams have greater directivity indices than directivity indices of the primary beams.

17. An article of manufacture for controlling transmissions between a first computing system and a second computing system, comprising:
a non-transitory machine-readable storage medium that stores instructions which, when executed by a processor in the first computing system,
generate a plurality of primary beams, including a first primary beam and a second primary beam, focused on areas of interest at a near-end location based on inputs from a microphone array;
generate one or more secondary beams focused away from the areas of interest at the near-end location based on inputs from the microphone array;
combine one of the secondary beams with the first primary beam to produce a new first primary beam; and
select either the new first primary beam or the original first primary beam for uplink to the second system based on correlation values computed between (1) the first primary beam and the second primary beam and (2) the new first primary beam and the second primary beam.

18. The article of manufacture of claim 17, wherein the non-transitory machine-readable storage medium stores further instructions which when executed by the processor:
generate a scale factor for scaling the secondary beam prior to combining the first primary beam with the secondary beam,
wherein the scale factor is controlled based on the correlation values computed between (1) the first primary beam and the second primary beam and (2) the new first primary beam and the second primary beam.

19. The article of manufacture of claim 17, wherein the original first primary beam is selected for uplink upon detecting that a correlation value between the first primary beam and the second primary beam is greater than a predefined correlation threshold,
wherein the new first primary beam is selected for uplink upon detecting that the correlation value between the first primary beam and the second primary beam is less than the predefined correlation threshold and a correlation value between the new first primary beam and the second primary beam is greater than the predefined correlation threshold.

20. The article of manufacture of claim 17, wherein the non-transitory machine-readable storage medium stores further instructions which when executed by the processor:

perform linear acoustic echo cancelling on the first primary beam, the second primary beam, and a de-correlating beam, wherein selection of either the new first primary beam or the original first primary beam for uplink is made based on statistic and status data generated during performance of linear acoustic echo cancellation.

* * * * *